N. WELLS.
MEAT-BLOCKS.

No. 195,317. Patented Sept. 18, 1877.

WITNESSES:
H. Rydquist
J. H. Scarborough

INVENTOR:
Newton Wells.
BY
ATTORNEYS.

UNITED STATES PATENT OFFICE.

NEWTON WELLS, OF PAINESVILLE, OHIO.

IMPROVEMENT IN MEAT-BLOCKS.

Specification forming part of Letters Patent No. 195,317, dated September 18, 1877; application filed March 19, 1877.

*To all whom it may concern:*

Figure 1:
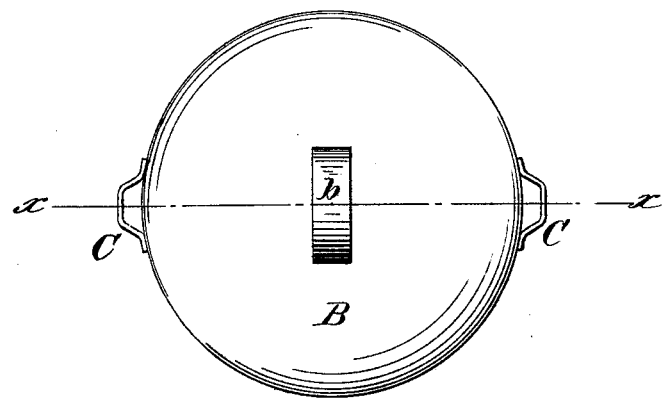
Figure 2:
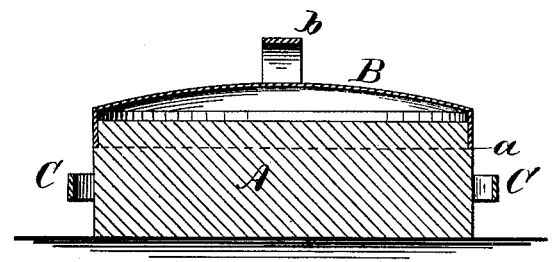
Figure 3:
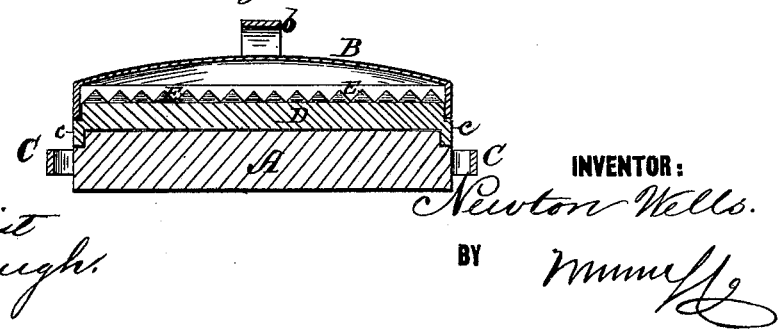

Be it known that I, NEWTON WELLS, of Painesville, in the county of Lake and State of Ohio, have invented a new and Improved Meat-Block, of which the following is a specification:

Figure 1 is a plan view. Fig. 2 is a transverse section on line $x\ x$ in Fig. 1. Fig. 3 represents the block having a roughened plate applied thereto for the purpose of tendering meat.

Similar letters of reference indicate corresponding parts.

My invention consists of a meat-block having a roughened plate detachably applied thereto, so that it can be used for tendering meat, and by removing said plate the block is left with a plain or flat surface, upon which meat may be cut or dressed. The block is provided with a cover to protect it from flies and dirt.

In the drawings, A is a circular block of wood, of suitable thickness and quality, having an offset, $a$, for receiving a cover, B, which is made of sheet-tin or other suitable sheet metal, and is provided with a handle, $b$. Handles C are attached to the sides of the block, for convenience in carrying it about.

The block is designed for use in families for chopping, pounding, or tendering meat. It is also provided with an attachment consisting of a plate of iron, D, of suitable thickness, the upper surface of which is roughened or provided with pyramidal projections E, and upon the lower side of which lugs $c$ are formed, that project over the edge of the block for retaining the plate in position. Meat may be tendered upon this plate by means of an ordinary plain mallet.

The block is so small that it is easily moved from place to place, and may be washed without difficulty.

Having thus described my invention, I claim as new and desire to secure by Letters Patent—

The combination of the detachable plate D, having lugs $c$, and provided with a roughened top surface, or with pyramidal projections E, with the meat-block A and removable cover B, as and for the purpose set forth.

NEWTON WELLS.

Witnesses:
JOEL DOOLITTLE,
SAML. MOODY.